(12) United States Patent
Miao et al.

(10) Patent No.: US 11,218,209 B2
(45) Date of Patent: Jan. 4, 2022

(54) INFORMATION TRANSMISSION METHOD AND DEVICE

(71) Applicant: China Academy of Telecommunications Technology, Beijing (CN)

(72) Inventors: Deshan Miao, Beijing (CN); Qiubin Gao, Beijing (CN); Runhua Chen, Beijing (CN); Tamrakar Rakesh, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/960,551

(22) PCT Filed: Dec. 19, 2018

(86) PCT No.: PCT/CN2018/122157
§ 371 (c)(1),
(2) Date: Jul. 8, 2020

(87) PCT Pub. No.: WO2019/137174
PCT Pub. Date: Jul. 18, 2019

(65) Prior Publication Data
US 2020/0343961 A1 Oct. 29, 2020

(30) Foreign Application Priority Data
Jan. 12, 2018 (CN) .......................... 201810032128.4

(51) Int. Cl.
*H04B 7/06* (2006.01)
(52) U.S. Cl.
CPC .......... *H04B 7/0626* (2013.01); *H04B 7/0617* (2013.01)

(58) Field of Classification Search
CPC .. H04B 7/0626; H04B 7/0617; H04B 7/0641; H04B 7/0478; H04B 7/0695; H04B 7/0408; H04B 7/0663
See application file for complete search history.

(56) References Cited

U.S. PATENT DOCUMENTS

2018/0367197 A1* 12/2018 Yang .................... H04B 7/0417
2019/0045460 A1*  2/2019 Muruganathan ..... H04B 7/0482
(Continued)

FOREIGN PATENT DOCUMENTS

| CN | 102124683 A | 7/2011 |
|---|---|---|
| CN | 104780023 A | 7/2015 |

(Continued)

OTHER PUBLICATIONS

CATT "Considerations on advanced CSI reporting", 3GPP TSG RAN WG1 Meeting #86bis, Lisbon, Portugal Oct. 10-14, 2016, total 11 pages, R1-1608724.

(Continued)

*Primary Examiner* — Kenneth T Lam
(74) *Attorney, Agent, or Firm* — Kilpatrick Townsend & Stockton, LLP (57) ABSTRACT

Disclosed are an information transmission method and device for improving CSI feedback performance and providing finer CSI feedback. The information transmission method of the present invention comprises: determining a quantity of layers transmitted on a channel; and determining, according to the quantity of the layers transmitted on the channel, channel state information (CSI) fed back for the respective layers, and transmitting the same, and the CSI fed back for the respective layers comprises information about multi-level beams.

19 Claims, 2 Drawing Sheets

Determining a quantity of layers transmitted on a channel — S101

Determining, according to the quantity of the layers transmitted on the channel, CSI fed back for the respective layers, and transmitting the same, where the CSI fed back for the respective layers includes information about multi-level beams — S102

(56) References Cited

U.S. PATENT DOCUMENTS

| | | | |
|---|---|---|---|
| 2019/0058517 A1* | 2/2019 | Kang | H04L 5/0048 |
| 2019/0199420 A1* | 6/2019 | Faxer | H04B 7/0632 |
| 2019/0319688 A1* | 10/2019 | Sun | H04B 7/10 |
| 2020/0059282 A1* | 2/2020 | Wu | H04W 72/04 |
| 2020/0112355 A1* | 4/2020 | Park | H04B 7/0626 |
| 2020/0136682 A1* | 4/2020 | Faxer | H04B 7/0658 |
| 2020/0162133 A1* | 5/2020 | Harrison | H04L 25/0226 |
| 2020/0195319 A1* | 6/2020 | Park | H04W 72/1226 |
| 2020/0244329 A1* | 7/2020 | Xiao | H04B 17/318 |

FOREIGN PATENT DOCUMENTS

| | | |
|---|---|---|
| CN | 105991231 A | 10/2016 |
| CN | 106559121 A | 4/2017 |
| CN | 107154841 A | 9/2017 |
| CN | 107181513 A | 9/2017 |
| CN | 107370525 A | 11/2017 |
| KR | 1020160007495 A | 1/2016 |
| WO | 2017071674 A1 | 5/2017 |
| WO | 2017075803 A1 | 5/2017 |
| WO | 2018202134 A1 | 11/2018 |

OTHER PUBLICATIONS

ZTE et al.,"Downloadable/Configurable codebook for NR MIMO", 3GPP TSG RAN WG1 Meeting #87, Reno, U.S.A., Nov. 14-18, 2016, total 6 pages, R1-1611418.

ZTE et al., "Linear combination based CSI feedback design for NR MIMO", 3GPP TSG RAN WG1 Meeting #88, Athens, Greece, Feb. 13-17, 2017, total 9 pages, R1-1701809.

* cited by examiner

INFORMATION TRANSMISSION METHOD AND DEVICE

The present application is a National Stage of International Application No. PCT/CN2018/122157 filed Dec. 19, 2018, which claims the priority to Chinese Patent Application No. 201810032128.4 filed with the Chinese Patent Office on Jan. 12, 2018 and entitled "Information Transmission Method and Device", and the entire contents of which are incorporated herein by reference.

FIELD

The present application relates to the field of communications, in particular to a method and device for transmitting information.

BACKGROUND

In a new radio (NR) phase 1, feedback manners of channel state information (CSI) type 1 and CSI type 2 have had preliminary standard definitions. The CSI type 1 inherits a traditional codebook feedback method, and the codebook structure is supposed to be $W=W1*W2$, where $W1$ corresponds to a long term beam direction, while $W2$ corresponds to beam selection and dual polarization coefficient merging. CSI type 2 is a more advanced quantization technology, has been preliminarily discussed in the long term evolution (LTE) version 14 (R14), and is mainly focused on direct quantization of channel coefficients. CSI feedback includes beam selection and corresponding coefficient feedback, and specifically, for each data stream (e.g. layer), the following several parts of CSI contents are included: beam index; broadband amplitude coefficient; and narrow band amplitude coefficient and phase coefficient.

In the feedback manner of CSI type 2, since feedback is performed per layer, i.e., CSI quantization is performed according to the quantity of streams to be transmitted by data, optimally, according to selection and merging of a plurality of beams, the CSI fed back by each layer can approximate the feature vector of each layer. It should be noted that, beam selection and coefficient selection are respectively performed based on polarization direction of the antenna.

In summary, in the related art, each beam is quantized according to beam selection, and quantitative merging of a plurality of beams is performed, therefore, the performance is greatly improved compared with the codebook-based feedback of type 1, and a great difference still exists compared with an ideal CSI feedback. The major shortcomings include: the selection of beam is broadband, and the number of beams is limited.

SUMMARY

Embodiments of the present application provide a method and device for transmitting information, to improve CSI feedback performance, and provide finer CSI feedback.

An embodiment of the present application provides a method for transmitting information. The method includes: determining a quantity of data streams for channel transmission; and determining, according to the quantity of the data streams for channel transmission, CSI fed back for the respective data streams, and transmitting the CSI fed back for the respective data streams, where the CSI fed back for the respective data streams includes information about multi-level beams.

By adopting the method, according to the quantity of data streams for channel transmission, the CSI fed back for the respective data streams is determined and transmitted, where the CSI fed back for the respective data streams includes information about multi-level beams, to improve the CSI feedback performance, and provide finer CSI feedback.

In one embodiments, the multi-level beams include one or more first-level beams and one or more second-level beams.

In one embodiments, the determining the CSI fed back for the respective data streams includes: selecting the one or more first-level beams from a first-level beam set, and determining the CSI corresponding to the one or more first-level beams; and selecting the one or more second-level beams from a second-level beam set according to the CSI corresponding to the one or more first-level beams, and determining the CSI corresponding to the one or more second-level beams.

In one embodiments, the second-level beam set is a single beam set, or the second-level beam set includes a plurality of beam subsets.

In one embodiments, the second-level beam set includes a plurality of second-level beam subsets, and each of the plurality of second-level beam subsets corresponds to one first-level beam in the first-level beam set.

In one embodiments, the selecting the one or more first-level beams from the first-level beam set, and determining the CSI corresponding to the one or more first-level beams includes: selecting the one or more first-level beams from the first-level beam set based on acquired CSI, and determining the CSI corresponding to the one or more first-level beams by quantizing the channel according to the selected one or more first-level beams; the selecting the one or more second-level beams from the second-level beam set, and determining the CSI corresponding to the one or more second-level beams includes: selecting the one or more second-level beams from the second-level beam set based on the CSI corresponding to the one or more first-level beams and the acquired CSI, and determining the CSI corresponding to the one or more second-level beams by quantizing the channel according to the selected one or more second-level beams.

In one embodiments, the determining and transmitting the CSI fed back for the respective data streams includes: selecting one or more first-level beams from a first-level beam set, and determining and transmitting the CSI corresponding to the selected one or more first-level beams; and selecting one or more second-level beams from a second-level beam set, and determining and transmitting the CSI corresponding to the selected one or more second-level beams.

In one embodiments, the CSI fed back for the one or more first-level beams and/or the CSI fed back for the one or more second-level beams are/is determined according to an instruction of a network side.

In one embodiments, the CSI fed back for the one or more second-level beams is transmitted separately or is transmitted jointly with the CSI fed back for the one or more first-level beams.

In one embodiments, the information about the multi-level beams includes at least indexes and quantized parameters of the multi-level beams.

In one embodiments, the quantized parameters include an amplitude coefficient and a phase coefficient.

An embodiment of the present application provides a device for transmitting information, including: a memory, configured to store program instructions; and a processor, configured to invoke the program instructions stored in the memory and perform the following operations according to the invoked program instructions: determining a quantity of data streams for channel transmission; and determining, according to the quantity of the data streams for channel transmission, CSI fed back for the respective data streams, and transmitting the CSI fed back for the respective data streams, where the CSI fed back for the respective data streams includes information about multi-level beams.

In one embodiments, the multi-level beams include one or more first-level beams and one or more second-level beams.

In one embodiments, the processor is configured to: select the one or more first-level beams from a first-level beam set, and determine the CSI corresponding to the one or more first-level beams; and select the one or more second-level beams from a second-level beam set according to the CSI corresponding to the one or more first-level beams, and determine the CSI corresponding to the one or more second-level beams.

In one embodiments, the second-level beam set is a single beam set, or the second-level beam set includes a plurality of beam subsets.

In one embodiments, the second-level beam set includes a plurality of second-level beam subsets, and each of the plurality of second-level beam subsets corresponds to one first-level beam in the first-level beam set.

In one embodiments, when selecting the one or more first-level beams from the first-level beam set, and determining the CSI corresponding to the one or more first-level beams, the processor is further configured to: select the one or more first-level beams from the first-level beam set based on acquired CSI, and determine the CSI corresponding to the one or more first-level beams by quantizing the channel according to the selected one or more first-level beams; and when selecting the one or more second-level beams from the second-level beam set, and determining the CSI corresponding to the one or more second-level beams, the processor is further configured to: select the one or more second-level beams from the second-level beam set based on the CSI corresponding to the one or more first-level beams and the acquired CSI, and determine the CSI corresponding to the one or more second-level beams by quantizing the channel according to the selected one or more second-level beams.

In one embodiments, the processor is further configured to: select one or more first-level beams from a first-level beam set, and determine and transmit the CSI corresponding to the selected one or more first-level beams; and select one or more second-level beams from a second-level beam set, and determine and transmit the CSI corresponding to the selected one or more second-level beams.

In one embodiments, the processor is further configured to: determine the CSI fed back for the one or more first-level beams and/or the CSI fed back for the one or more second-level beams according to an instruction of a network side.

In one embodiments, the CSI fed back for the one or more second-level beams is transmitted separately or is transmitted jointly with the CSI fed back for the one or more first-level beams.

In one embodiments, the information about the multi-level beams includes at least indexes and quantized parameters of the multi-level beams.

In one embodiments, the quantized parameters include an amplitude coefficient and a phase coefficient.

An embodiment of the present application provides another information transmission device, including: a first device, configured to determine a quantity of data streams for channel transmission; and a second device, configured to determine, according to the quantity of the data streams for channel transmission, CSI fed back for the respective data streams, and transmit the CSI fed back for the respective data streams, where the CSI fed back for the respective data streams includes information about multi-level beams.

Another embodiment of the present application provides a computer readable storage medium, where the computer readable storage medium stores computer executable instructions, and the computer executable instructions are configured to enable a computer to perform any of the above methods.

BRIEF DESCRIPTION OF THE DRAWINGS

In order to more clearly illustrate technical solutions in embodiments of the present application, a brief introduction will be given below on accompanying drawings which need to be used in the description of the embodiments. Apparently, the accompanying drawings described below are merely some embodiments of the present application.

DETAILED DESCRIPTION OF THE EMBODIMENTS

Embodiments of the present application provide a method and device for transmitting information, to improve the CSI feedback performance, and provide finer CSI feedback.

In a 5G NR system, to improve capacity of a downlink system, the precision of CSI feedback is greatly improved compared with the LTE, and the CSI feedback manners of type 1 and type 2 are standardized. Due to limitations of a standard process, the CSI feedback of type 2 is not sufficiently optimized. An embodiment of the present application provides a CSI feedback solution. Under the premise that the total cost is controllable, the CSI quantization solution of type 2 is further optimized with a multi-level quantization mechanism, effectively improving the capacity of downlink transmission.

A CSI feedback method provided in an embodiment of the present application can improve the CSI feedback precision, and enable a base station to acquire the CSI with a higher precision. The CSI feedback method mainly includes: providing a multi-level (for example, two-level) channel coefficient feedback for each layer according to the quantity of data streams for channel transmission, that is, separately feeding back a two-level beam index and related coefficients for the respective data streams according to the quantity of ranks, and the CSI feedback method includes: method 1 and method 2.

Method 1: Using Two-Level Channel Coefficients to Feedback Jointly.

The first-level feedback corresponds to a first-level beam set. The first-level beam set includes N1 beams. The second-level feedback corresponds to a second-level beam set. The second-level beam set may be a larger set including N2 beams, or may also be a set including a plurality of beam subsets.

As to the selection of beams, two specific solutions can be for example included.

The first solution: UE selects one or more beams from the first-level beam set, performs the second-level beam feedback according to an index or indexes of the selected one or more beams, and then selects one or more second-level beams from corresponding beam subsets for the respective first-level beams.

The second solution: UE selects a plurality of beams from the first-level beam set for quantization feedback, and then selects one or more proper beams from the second-level beam set for quantization feedback.

The indexes and corresponding coefficients of two-level beams are fed back to gNB.

Method 2: Using Two-Level Channel Coefficients to Feedback Separately.

The first-level beam feedback corresponds to the first-level beam set, one or more beams are selected from the first-level beam set.

The second-level beam feedback corresponds to the second-level beam set, and one or more beams are selected from the second-level beam set.

The first-level beam information feedback and the second-level beam information feedback may both be configured by a network side. A terminal may select to feed back the first-level beam information or the second-level beam information according to signaling of the network side, or the first-level beam information and the second-level beam information can also be fed back simultaneously. A typical application is the configuration of a periodical first-level beam information feedback and the non-periodic second-level beam information feedback. Of course, the UE can also autonomously determine to report the first-level beam information or the second-level beam information, or to report the two types of information simultaneously.

Figure 1:
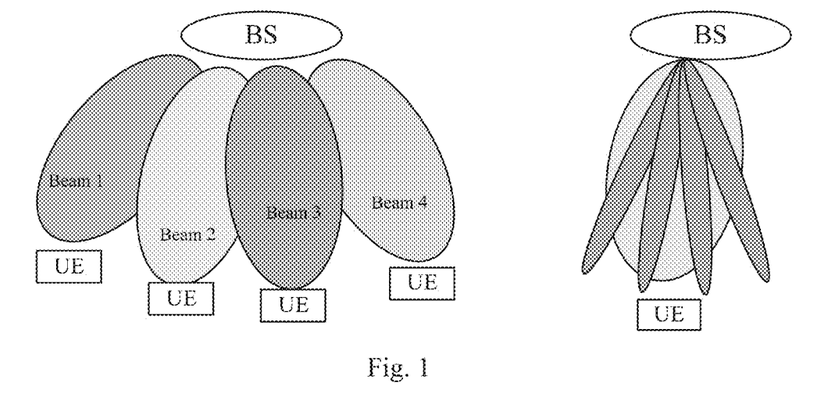
FIG. 1 is a schematic diagram of a coverage area of two-level beams provided in an embodiment of the present application.

As shown in FIG. 1, the structure of two-level beams (i.e., level 1 beam and level 2 beam in the figure) is shown. Level 1 beam is to divide one cell into four regions, and each region corresponds to one level 1 beam, which are respectively beam 1, beam 2, beam 3 and beam 4. Further, one level 1 beam is further divided into four second-level beams (i.e., level 2 beam) for coverage.

Specific examples will be given below for illustration.

Embodiment 1: Joint Feedback of Level 2 Beam and Channel Coefficient

A beam set is established as below.

The first-level feedback corresponds to the first-level beam set, where the first-level beam set includes N1 beam vectors.

For example, B1 represents the first-level beam set. B1=[V1, V2 ... VN1]. Vi is a beam vector of a discrete Fourier transform (DFT) of N*1, and belongs to B1. The value of i ranges from 1 to N1, and N is the quantity of ports of a channel state information reference signal (CSI-RS). The total quantity of beams of B1 is N1.

The second-level feedback corresponds to the second-level beam set, where the second-level beam set is one single big beam set including N2 beams, or includes a plurality of small beam sets (i.e., beam subsets).

The single big beam set may be generated with DFT vectors.

For the plurality of small beam sets, each beam of the first-level beam set can generate a corresponding beam subset, and each beam subset includes K beams.

For example, B2(i) represents the second-level beam subset, B2(i)=[U1, U2 ... UN2], Uj is a beam vector of N*1, and belongs to B2(i), the value of j ranges from 1 to N2, N is the quantity of ports of CSI-RS, and the i herein represents an index of the beam subset.

B2 is generated in a plurality of manners as following.

In a first generation manner, B2(i) represents any beam subset, B2(i)={Vi○ C}, C is a DFT vector set, and Vi is a beam vector in the first-level beam set. ○ refers to projection of C in the Vi direction.

In a second generation manner, a DFT set of (M*N, M*N) is generated and N columns are selected from the DFT set of (M*N, M*N) to constitute a vector set of (N, M*N), each vector is the beam vector of N*1, one subset is chosen for each first-level beam vector, and each subset includes K beam vectors.

In the first-level beam set and the second-level beam set, to reduce feedback cost, each beam set can be rotated (the specific rotating manner is the related art and will not be repeated redundantly herein), i.e., through rotation in a direction, a new beam set is generated, at this time, the UE needs to select a beam index and a corresponding rotation factor index. Before rotation, the beams contained in one beam set are evenly segmented in one vector space, however, an angle interval still exists between beams. If one rotation factor is multiplied, it means that the new beam set is deviated for an angle before relative rotation, therefore, the new beam set can fill the empty space of the previous beam set, and perform even segmentation after angle deviation in the same vector space.

In the above beam set, the dimension of the beam vector is N*1. If a base station antenna is polarized, to reduce the quantity of beams, the dimension of the beam vector can be configured to be N/2*1, i.e., the antenna at each polarized direction separately performs channel quantization, and the feedback beam and quantization coefficient need to contain information of two polarization directions.

The selection of the beam and related coefficients are introduced as follows.

Eigenvalue decomposition (EVD) is performed for the received channel information H, and each feature vector is separately fed back.

Rank 1 is taken as an example for quantization illustration.

Step 1: selecting the first-level beam for the feature vector V, and determining one or more beam vectors and corresponding coefficients according to the matching degree.

A matching formula is: max{corr(V, Vi)}. That is, a vector with a larger correlation value with the feature vector is searched, according to the selected Vi, quantization coefficients are selected, V~C1i*Vi, C1i is a most proper coefficient selected from the predefined phase amplitude coefficients, Vi is closest to V. If channel quantization is separately performed on each polarization direction, then a channel and beam in a single polarization direction need to be selected for separate matching quantization.

Two schemes can be considered for the selection of the first-level beam.

Scheme 1: A Broadband Beam is Selected, but the Quantization Coefficient is Subband.

At this time, the beam is selected to be broadband, i.e., a beam is selected for one carrier or one bandwidth part (BWP). The selection of quantization coefficients should be calculated based on a subband, the feature vector of a subband is firstly acquired, since it is the beam selection of rank 1, then the largest feature vector is subject to coefficient matching.

Scheme 2: The Beam and Coefficient is Selected Separately for Each Subband.

At this time, the beam is selected to be narrowband, i.e., each frequency-domain subband should be subject to beam selection and coefficient selection, and the following steps are included: the feature vector of a subband is firstly acquired, and according to the above matching formula, the beam and quantization coefficient are simultaneously selected.

During practical calculations, since the amplitude feedback quantity is large, the amplitude coefficient is divided into a broadband coefficient and a narrowband coefficient, the wideband coefficient means that a large bandwidth (for example 20 MHz) uses a coefficient, while the narrowband coefficient means the deviation value of each subband (for example, 1 MHz) relative to the broadband coefficient.

If rank is larger than 1, then each layer should be separately subject to beam selection and coefficient selection, and the specific steps are similar to those of rank 1.

The feedback coefficient required after quantization of the first-level beam includes: beam index, phase and amplitude coefficient. In one embodiments, the beam can be subdivided into a broadband beam and a subband beam, and the coefficient can be subdivided into a subband amplitude coefficient, a broadband amplitude coefficient and a phase coefficient.

Step 2: the second-level beam vector and corresponding coefficients are selected.

Suppose that only one first-level beam is selected, then a corresponding beam only needs to be selected from the corresponding second beam subset, and the following formula is abided by:

$$V \sim = C1i * Vi + C2j * Uj.$$

C2j is the coefficient of the second-level beam, and Uj is the second-level beam vector.

The selection of the second-level beam is performed in the subband, i.e., each subband has an independent second-level beam and coefficient selection.

A proper beam can also be selected from a big second-level beam set for quantization, and the above formula should also be abided by:

$$V \sim = C1i * Vi + C2j * Uj$$

C2j is the coefficient of the second-level beam, and Uj is the second-level beam vector.

Since the selection of the second-level beam is a finer beam selection, then the beam selection is performed on the subband, and the coefficient is also subband.

The feedback coefficient required after quantization of the second-level beam includes: second-level beam index, subband phase and amplitude coefficient.

The feedback of beam index and quantization coefficient is introduced as follows.

The feedback of the first-level beam index and corresponding coefficient and the feedback of the second-level beam index and corresponding coefficient can be performed separately, which includes the following schemes.

Scheme 1: the first-level beam index and the corresponding coefficient, and the second-level beam index and the corresponding coefficient are fed back in a single physical uplink control channel (PUCCH), and the two parts are coded separately.

Since the channel coefficient feedback quantity is large, a long PUCCH can be adopted for feedback.

Scheme 2: different PUCCHs are used to feed back the first-level CSI and the second-level CSI, and configure different periods.

Scheme 3: a single physical uplink shared channel (PUSCH) carries the first-level beam index and the corresponding coefficient, and the second-level beam index and the corresponding coefficient.

Scheme 4: the first-level broadband beam index and broadband coefficient are fed back in the PUCCH, and the remaining subband beam indexes and coefficients are fed back in the PUSCH.

Scheme 5: the first-level broadband beam index and broadband coefficient are fed back in a short PUCCH, and the remaining subband beam indexes and coefficients are fed back in a long PUCCH.

Embodiment 2: The Two Levels of Beams and Channel Coefficients are Fed Back Separately For the separate two-level CSI feedback, the beam set and beam selection are the same as joint feedback, and the main difference lies in the feedback manner. In separate two-level feedback, the first-level beam feedback is periodical, while the second-level beam feedback is triggered as required, and can be triggered to report by gNB or UE.

Since the triggering manners of the first-level feedback and the second-level feedback are different, the following several CSI reporting solutions are included.

Solution 1: the first-level beam feedback uses a periodical PUCCH, while the second beam feedback adopts a non-periodic PUCCH.

Solution 2: the first-level beam index and coefficient fed back in the PUCCH are used to trigger PUSCH to feedback the second-level narrowband beam index and coefficient.

The narrowband mentioned in the embodiment of the present application just corresponds to one subband, and corresponds to the second-level beam feedback.

Solution 3: a semi-persistent manner (the manner is the related art which means that periodic feedback in a period of time requires an activation signaling and a release signaling) is used to feed back the first-level beam index and coefficient and trigger the PUSCH to feedback the second-level beam index and coefficient.

Figure 2:
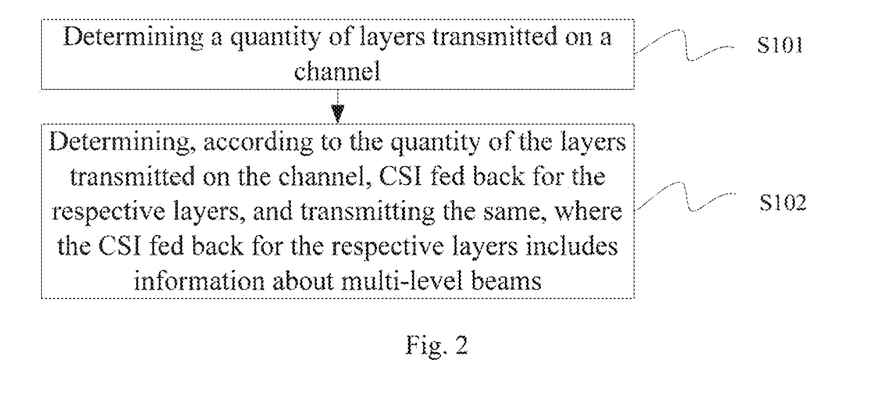
FIG. 2 is a flow diagram of a method for transmitting information provided in an embodiment of the present application.

In summary, referring to FIG. 2, at a terminal side, an embodiment of the present application provides a method for transmitting information. The method includes the following operations.

S101, determining a quantity of data streams for channel transmission.

S102, determining, according to the quantity of the data streams for channel transmission, channel state information (CSI) fed back for the respective data streams, and transmitting the same, where the CSI fed back for the respective data streams includes information about multi-level beams.

The information of multi-level beam can be the information of two-level beam, of course, can also be the information of more-level beam. In the above embodiment, the information of two-level beam is taken as an example for illustration, which is not limited herein.

Through the method, according to the quantity of data streams for channel transmission, the channel state information (CSI) fed back for the respective data streams is determined and transmitted, where the CSI fed back for the respective data streams includes information about multi-level beams, to improve the CSI feedback performance, and provide finer CSI feedback.

In one embodiments, the multi-level beams include one or more first-level beams and one or more second-level beams.

In one embodiments, the determining the CSI fed back for the respective data streams includes: selecting the one or more first-level beams from a first-level beam set, and determining the CSI corresponding to the one or more first-level beams; and selecting the one or more second-level beams from a second-level beam set according to the CSI corresponding to the one or more first-level beams, and determining the CSI corresponding to the one or more second-level beams.

For example, in the above method 1, two-level channel coefficients are used to feedback jointly.

In one embodiments, the second-level beam set is a single beam set, or the second-level beam set includes a plurality of beam subsets.

In one embodiments, the second-level beam set includes a plurality of second-level beam subsets, and each second-level beam subset corresponds to one first-level beam in the first-level beam set.

In one embodiments, the selecting the one or more first-level beams from the first-level beam set, and determining the CSI corresponding to the one or more first-level beams includes: selecting the one or more first-level beams from the first-level beam set based on acquired CSI, and determining the CSI corresponding to the one or more first-level beams by quantizing the channel according to the selected one or more first-level beams; the selecting the one or more second-level beams from the second-level beam set, and determining the CSI corresponding to the one or more second-level beams includes: selecting the one or more second-level beams from the second-level beam set based on the CSI corresponding to the one or more first-level beams and the acquired CSI, and determining the CSI corresponding to the one or more second-level beams by quantizing the channel according to the selected one or more second-level beams.

In one embodiments, the determining and transmitting the CSI fed back for the respective data streams includes: selecting one or more first-level beams from a first-level beam set, and determining and transmitting the CSI corresponding to the selected one or more first-level beams; and selecting one or more second-level beams from a second-level beam set, and determining and transmitting the CSI corresponding to the selected one or more second-level beams.

For example, in the above method 2, two-level channel coefficients are used to feedback separately.

In one embodiments, the CSI fed back for the one or more first-level beams and/or the CSI fed back for the one or more second-level beams are/is determined according to an instruction of a network side.

In one embodiments, the CSI fed back for the one or more second-level beams is transmitted separately or is transmitted jointly with the CSI fed back for the one or more the first-level beams.

In one embodiments, the information about the multi-level beams includes at least indexes and quantized parameters of the multi-level beams.

In one embodiments, the quantized parameters include an amplitude coefficient and a phase coefficient.

Figure 3:
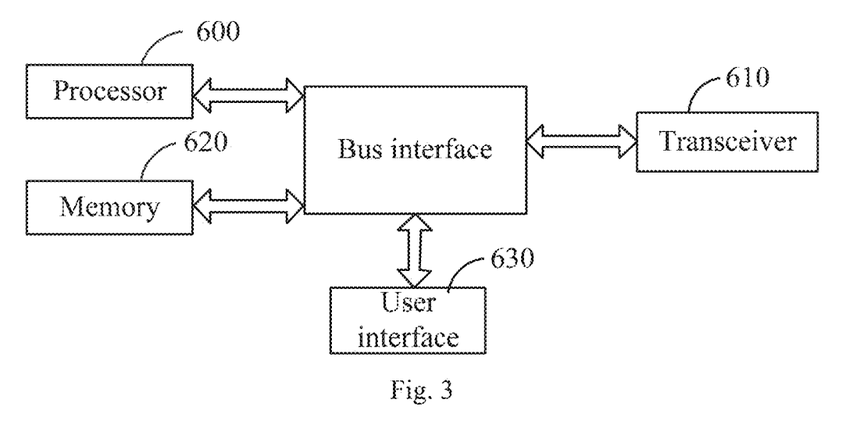
FIG. 3 is a structural schematic diagram of a device for transmitting information provided in an embodiment of the present application.

Correspondingly, referring to FIG. 3, at a terminal side, a device for transmitting information provided in an embodiment of the present application includes: a processor 600, configured to read programs stored in the memory 620 and perform the following steps: determining a quantity of data streams for channel transmission; and determining, according to the quantity of the data streams for channel transmission, CSI fed back for the respective data streams, and transmitting the same through a transceiver 610, where the CSI fed back for the respective data streams includes information about multi-level beams.

In one embodiments, the multi-level beams include one or more first-level beams and one or more second-level beams.

In one embodiments, the processor 600 is configured to: select the one or more first-level beams from a first-level beam set, and determine the CSI corresponding to the one or more first-level beams; and select the one or more second-level beams from a second-level beam set according to the CSI corresponding to the one or more first-level beams, and determine the CSI corresponding to the one or more second-level beams.

In one embodiments, the second-level beam set is a single beam set, or the second-level beam set includes a plurality of beam subsets.

In one embodiments, the second-level beam set includes a plurality of second-level beam subsets, and each of the plurality of second-level beam subsets corresponds to one first-level beam in the first-level beam set.

In one embodiments, when selecting the one or more first-level beams from the first-level beam set, and determining the CSI corresponding to the one or more first-level beams, the processor 600 is further configured to: select the one or more first-level beams from the first-level beam set based on acquired CSI, and determine the CSI corresponding to the one or more first-level beams by quantizing the channel according to the selected one or more first-level beams; and when selecting the one or more second-level beams from the second-level beam set, and determining the CSI corresponding to the one or more second-level beams, the processor 600 is further configured to: select the one or more second-level beams from the second-level beam set based on the CSI corresponding to the one or more first-level beams and the acquired CSI, and determine after the CSI corresponding to the one or more second-level beams by quantizing the channel according to the selected one or more second-level beams.

In one embodiments, the processor 600 is further configured to: select one or more first-level beams from a first-level beam set, and determine and transmit the CSI corresponding to the selected one or more first-level beams; and select one or more second-level beams from a second-level beam set, and determine and transmit the CSI corresponding to the selected one or more second-level beams.

In one embodiments, the processor 600 is further configured to: determine the CSI fed back for the one or more first-level beams and/or the CSI fed back for the one or more second-level beams according to an instruction of a network side.

In one embodiments, the CSI fed back for the one or more second-level beams is transmitted separately or is transmitted jointly with the CSI fed back for the one or more first-level beams.

In one embodiments, the information about the multi-level beam includes at least the indexes and quantized parameters of the multi-level beams.

In one embodiments, the quantized parameters include an amplitude coefficient and a phase coefficient.

The transceiver 610 is configured to receive and transmit data under the control of a processor 600.

Where in FIG. 3, the bus architecture can include any quantity of interconnected buses and bridges, and various circuits of one or more processors represented by the processor 600 and the memory represented by the memory 620 are linked together. The bus architecture can also link together various other circuits such as peripheral equipment, a voltage stabilizer and a power management circuit, which are all well known in the field, and therefore is not further described in the text. The bus interface provides an interface. The transceiver 610 can be a plurality of elements, can include a transmitter and a receiver, and provide devices to communicate with various other devices on the transmission media. Aiming at different user equipment, the user interface 630 can also be an interface which can be externally and internally connected with a desired device, and the connected devices include but are not limited to a keypad, a display, a loudspeaker, a microphone and an operating lever.

The processor 600 is responsible for managing the bus architecture and ordinary processing, and the memory 620 can store the data used by the processor 600 in performing the operation.

In one embodiments, the processor 600 can be a CPU (central processing device), an ASIC (application specific integrated circuit), an FPGA (field-programmable gate array) or a CPLD (complex programmable logic device).

Figure 4:
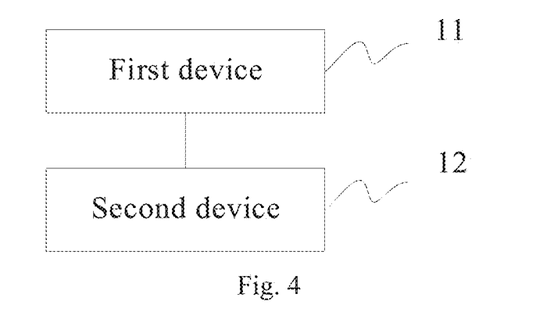
FIG. 4 is a structural schematic diagram of another device for transmitting information provided in an embodiment of the present application.

Please refer to FIG. 4, at a terminal side, another device for transmitting information provided in an embodiment of the present application includes: a first device 11, configured to determine the quantity of data streams for channel transmission; and a second device 12, configured to determine, according to the quantity of the data streams for channel transmission, channel state information (CSI) fed back for the respective data streams, and transmit the same, where the CSI fed back for the respective data streams includes information about multi-level beams.

In one embodiments, the multi-level beams include one or more first-level beams and one or more second-level beams.

In one embodiments, the second device 12 is configured to: select the one or more first-level beams from a first-level beam set, and determine the CSI corresponding to the one or more first-level beams; and select the one or more second-level beams from a second-level beam set according to the CSI corresponding to the one or more first-level beams, and determine the CSI corresponding to the one or more second-level beams.

In one embodiments, the second-level beam set is a single beam set, or the second-level beam set includes a plurality of beam subsets.

In one embodiments, the second-level beam set includes a plurality of second-level beam subsets, and each of the plurality of second-level beam subsets corresponds to one first-level beam in the first-level beam set.

In one embodiments, when selecting the one or more first-level beams from the first-level beam set, and determining the CSI corresponding to the one or more first-level beams, the second device 12 is further configured to: select the one or more first-level beams from the first-level beam set based on acquired CSI, and determining after the CSI corresponding to the one or more first-level beams by quantizing the channel according to the selected one or more first-level beams; when selecting the one or more second-level beams from the second-level beam set, and determining the CSI corresponding to the one or more second-level beams, the second device 12 is further configured to: select the one or more second-level beams from the second-level beam set based on the CSI corresponding to the one or more first-level beams and the acquired CSI, and determine the CSI corresponding to the one or more second-level beams by quantizing the channel according to the selected one or more second-level beams.

In one embodiments, the second device 12 is further configured to: select one or more first-level beams from a first-level beam set, and determine and transmit the CSI corresponding to the selected one or more first-level beams; and select one or more second-level beams from a second-level beam set, and determine and transmit the CSI corresponding to the selected one or more second-level beams.

In one embodiments, the second device 12 is further configured to: determine the CSI fed back for the one or more first-level beams and/or the CSI fed back for the one or more second-level beams according to an instruction of a network side.

In one embodiments, the CSI fed back for the one or more second-level beams is transmitted separately or is transmitted jointly with the CSI fed back for the one or more first-level beams.

In one embodiments, the information about multi-level beams includes at least indexes and quantized parameters of the multi-level beams.

In one embodiments, the quantized parameters include an amplitude coefficient and a phase coefficient.

An embodiment of the present application provides a readable computer storage medium, where the computer readable storage medium is configured to store computer executable instructions used by the above computing device, and the computer storage medium contains programs configured to perform any of the methods provided in the above embodiments of the present application.

The computer storage medium can be any usable medium or data storage device which can be accessed by the computer, and includes but is not limited to a magnetic memory (for example, a floppy disk, a hard disk, a magnetic tape, a magneto-optical disk (MO), etc.), an optical memory (for example, CD, DVD, BD, HVD, etc.), a semiconductor memory (for example, ROM, EPROM, EEPROM, a non-volatile memory (NAND FLASH), and a solid state drive (SSD), etc.

The method provided in an embodiment of the present application can be applied to a terminal device, where the terminal device can also be called user equipment (abbreviated as UE), a mobile station (abbreviated as MS), a mobile terminal, etc. In one embodiments, the terminal can have the capability of communicating with one or more core networks through a radio access network (RAN), for example, the terminal can be a mobile terminal (or called as a honeycomb telephone) or a computer with a mobile property, for example, the terminal can also be a portable, pocket-size, handheld, computer built-in or vehicle-mounted mobile device.

In summary, in an embodiment of the present application, according to the quantity of flows for channel transmission, a two-level channel coefficient feedback is provided for each layer, that is, according to the quantity of ranks, a second-level beam index and related coefficient are separately fed back to each layer, respective beam set of the two-level feedback is created, and the indexes and corresponding coefficients of the two-level beams are fed back separately or jointly to the gNB. The PUCCH is combined with PUSCH to feed back the first-level and second-level CSI. Compared with the related art, the precision of CSI feedback is improved in an embodiment of the present application, and a structure of two-level feedback is used at the same time, therefore, when the feedback cost is fixed, the respective cost of two levels is reasonably allocated, and reasonable compromise of feedback precision and feedback cost is realized.

The embodiments of the present application can be embodied as a method, a system or a computer program product. Therefore, the present application can be embodied in the form of an all-hardware embodiment, an all-software embodiment or an embodiment of software and hardware in combination. Furthermore, the present application can be embodied in the form of a computer program product embodied in one or more computer useable storage media (including but not limited to a disk memory and an optical memory, etc.) in which computer useable program codes are contained.

The present application has been described in a flow chart and/or a block diagram of the method, the device (system) and the computer program product according to the embodiments of the present application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine, so that the instructions executed on the computer or the processor of the other programmable data processing device create means for performing the functions specified in the flow(s) of the flow chart and/or the block(s) of the block diagram.

These computer program instructions can also be stored into a computer readable memory for directing the computer or the other programmable data processing devices to operate in a specific manner, so that the instructions stored in the computer readable memory create an article of manufacture including instruction means, and such instruction means perform the functions specified in the flow(s) of the flow chart and/or the block(s) of the block diagram.

These computer program instructions can also be loaded onto the computer or the other programmable data processing devices, a series of operational steps are performed on the computer or the other programmable devices to produce computer-implemented processing, then the instructions executed on the computer or the other programmable devices provide steps for realizing the functions specified in the flow(s) of the flow chart and/or the block(s) of the block diagram.

Evidently those skilled in the art can make various modifications and variations to the embodiment of the present application without departing from the spirit and scope of the embodiment of the present application. Thus the present application is also intended to encompass these modifications and variations thereto so long as the modifications and variations come into the scope of the claims appended to the present application and their equivalents.

What is claimed is:

1. A method for transmitting information, comprising:
   determining a quantity of data streams for channel transmission; and
   determining and transmitting, channel state information (CSI) fed back for the respective data streams, according to the quantity of the data streams for channel transmission, wherein the CSI fed back for the respective data streams comprises information about multi-level beams;
   wherein the multi-level beams comprise one or more first-level beams and one or more second-level beams;
   the information about the multi-level beams comprises at least indexes and quantized parameters of the one or more first-level beams, and indexes and quantized parameters of the one or more second-level beams; and
   the information about the multi-level beams is configured to determine a target beam vector, and the target beam vector is a beam matching the data streams based on channel information.

2. The method according to claim 1, wherein the determining the CSI fed back for the respective data streams comprises:
   selecting the one or more first-level beams from a first-level beam set, and determining the CSI corresponding to the one or more first-level beams; and
   selecting the one or more second-level beams from a second-level beam set according to the CSI corresponding to the one or more first-level beams, and determining the CSI corresponding to the one or more second-level beams.

3. The method according to claim 2, wherein the second-level beam set is a single beam set, or the second-level beam set is a beam set comprising a plurality of second-level beam subsets.

4. The method according to claim 3, wherein the second-level beam set comprises a plurality of second-level beam subsets, and each of the plurality of second-level beam subsets corresponds to a respective one of the one or more first-level beams in the first-level beam set.

5. The method according to claim 2, wherein the selecting the one or more first-level beams from the first-level beam set, and determining the CSI corresponding to the one or more first-level beams comprises:
   selecting the one or more first-level beams from the first-level beam set based on acquired CSI, and determining the CSI corresponding to the one or more first-level beams by quantizing a channel according to the selected one or more first-level beams;
   the selecting the one or more second-level beams from the second-level beam set, and determining the CSI corresponding to the one or more second-level beams comprises:
   selecting the one or more second-level beams from the second-level beam set based on the CSI corresponding to the one or more first-level beams and the acquired CSI, and determining the CSI corresponding to the one or more second-level beams by quantizing the channel according to the selected one or more second-level beams.

6. The method according to claim 1, wherein the determining and transmitting the CSI fed back for the respective data streams comprises:
   selecting one or more first-level beams from a first-level beam set, and determining and transmitting the CSI corresponding to the selected one or more first-level beams; and
   selecting one or more second-level beams from a second-level beam set, and determining and transmitting the CSI corresponding to the selected one or more second-level beams.

7. The method according to claim 6, wherein the CSI fed back for the one or more first-level beams and/or the CSI fed back for the one or more second-level beams are/is determined according to an instruction of a network side.

8. The method according to claim 7, wherein the CSI fed back for the one or more second-level beams is transmitted separately, or the CSI fed back for the one or more second-level beams is transmitted jointly with the CSI fed back for the one or more first-level beams.

9. The method according to claim 1,
wherein the quantized parameters comprise an amplitude coefficient and a phase coefficient.

10. A non-transitory computer readable storage medium, wherein the computer readable storage medium stores computer executable instructions, and the computer executable instructions are configured to enable a computer to perform the method according to claim 1.

11. A device for transmitting information, comprising:
a memory, configured to store program instructions; and
a processor, configured to invoke the program instructions stored in the memory and perform the following operations according to the invoked program instructions:
determining a quantity of data streams for channel transmission; and
determining and transmitting, channel state information (CSI) fed back for the respective data streams, according to the quantity of the data streams for channel transmission, wherein the CSI fed back for the respective data streams comprises information about multi-level beams;
wherein the multi-level beams comprise one or more first-level beams and one or more second-level beams;
the information about the multi-level beams comprises at least indexes and quantized parameters of the one or more first-level beams, and indexes and quantized parameters of the one or more second-level beams; and
the information about the multi-level beams is configured to determine a target beam vector, and the target beam vector is a beam matching the data streams based on channel information.

12. The device according to claim 11, wherein the processor is configured to:
select the one or more first-level beams from a first-level beam set, and determine the CSI corresponding to the one or more first-level beams; and
select the one or more second-level beams from a second-level beam set according to the CSI corresponding to the one or more first-level beams, and determine the CSI corresponding to the one or more second-level beams.

13. The device according to claim 12, wherein the second-level beam set is a single beam set, or the second-level beam set is a beam set comprising a plurality of second-level beam subsets.

14. The device according to claim 13, wherein the second-level beam set comprises a plurality of second-level beam subsets, and each of the plurality of second-level beam subsets corresponds to one first-level beam in the first-level beam set.

15. The device according to claim 12, wherein when selecting the one or more first-level beams from the first-level beam set, and determining the CSI corresponding to the one or more first-level beams, the processor is further configured to:
select the one or more first-level beams from the first-level beam set based on acquired CSI, and determine the CSI corresponding to the one or more first-level beams by quantizing a channel according to the selected one or more first-level beams; and
when selecting the one or more second-level beams from the second-level beam set, and determining the CSI corresponding to the one or more second-level beams, the processor is further configured to:
select the one or more second-level beams from the second-level beam set based on the CSI corresponding to the one or more first-level beams and the acquired CSI, and determine the CSI corresponding to the one or more second-level beams by quantizing the channel according to the selected one or more second-level beams.

16. The device according to claim 11, wherein the processor is further configured to:
select one or more first-level beams from a first-level beam set, and determine and transmit the CSI corresponding to the selected one or more first-level beams; and
select one or more second-level beams from a second-level beam set, and determine and transmit the CSI corresponding to the selected one or more second-level beams.

17. The device according to claim 16, wherein the processor is further configured to:
determine the CSI fed back for the one or more first-level beams and/or the CSI fed back for the one or more second-level beams according to an instruction of a network side.

18. The device according to claim 17, wherein the CSI fed back for the one or more second-level beams is transmitted separately, or the CSI fed back for the one or more second-level beams is transmitted jointly with the CSI fed back for the one or more first-level beams.

19. The device according to claim 11,
wherein the quantized parameters comprise an amplitude coefficient and a phase coefficient.

* * * * *